US006897767B2

(12) United States Patent

Kim

(10) Patent No.: US 6,897,767 B2
(45) Date of Patent: May 24, 2005

(54) MULTIWAY CONTROL SYSTEM FOR KEYSET

(76) Inventor: Jong-Hae Kim, c/o 818 N. Pacific Ave. #E, Glendale, CA (US) 91202

( * ) Notice: Subject to any disclaimer, the term of this patent is extended or adjusted under 35 U.S.C. 154(b) by 0 days.

(21) Appl. No.: 10/254,944

(22) Filed: Sep. 23, 2002

(65) Prior Publication Data

US 2003/0036825 A1 Feb. 20, 2003

Related U.S. Application Data

(63) Continuation of application No. PCT/KR01/00495, filed on Mar. 28, 2001.

(51) Int. Cl.[7] ................................................ B60R 25/10

(52) U.S. Cl. ............................. 340/426.35; 340/426.3; 340/932.2

(58) Field of Search ....................... 340/426.13, 426.14, 340/426.16, 426.3, 426.35, 932.2, 988, 989, 5.2, 5.64, 5.72, 426.1, 426.2, 426.28, 426.36, 5.21, 5.22, 10.1, 10.52, 825.56; 307/10.3, 10.5; 701/213, 36

(56) References Cited

U.S. PATENT DOCUMENTS 3,906,447 A * 9/1975 Crafton ...................... 340/5.3
5,565,857 A * 10/1996 Lee ........................... 340/5.42
5,710,557 A * 1/1998 Schuette .................. 340/932.2
5,774,043 A * 6/1998 Mizuno et al. ........ 340/426.35
5,775,142 A * 7/1998 Kim ............................ 70/277
5,796,329 A * 8/1998 Bachhuber ............. 340/426.35
6,052,646 A * 4/2000 Kirkhart et al. ............ 701/213
6,093,980 A * 7/2000 Yamamoto et al. ........ 307/10.5
6,331,812 B1 * 12/2001 Dawalibi .................... 340/5.2
6,400,255 B1 * 6/2002 Ohnishi et al. ............ 340/5.62

* cited by examiner

*Primary Examiner*—Van T. Trieu

(57) ABSTRACT

This invention is related to a method and a system apparatus for replacing the conventional key with user's personal digital data which users are always carrying for the multi-way control of a vehicle for a normal driving, an abnormal driving, an anti-carjacking, a keyless ignition and a key-free valet parking, as well as the multi-way control of the keyset of a safe, a filing cabinet, a lockable door, and a military armaments according to the digital data of user's input without installing a costly PC network. Accordingly, the present invention also provides a system apparatus of the hotel door lock system which hotel guests make their own digital unlocking system utilizing their own personal card or password for replacing the existing key so that it does not need any special cards nor keys to carry extra.

32 Claims, 2 Drawing Sheets

MULTIWAY CONTROL SYSTEM FOR KEYSET

CROSS-REFERENCE TO RELATED APPLICATIONS

This application is a continuation of co-pending International Application No. PCT/KR01/00495, filed Mar. 28, 2001, which designated the United States. Furthermore, the International Application No. PCT/KR01/00495 is a continuation in part of the International Application No. PCT/KR98/00151, filed Jun. 10, 1998, and the U.S. Pat. No. 5,885,142, filed Jul. 7, 1998.

BACKGROUND OF THE INVENTION

1. Field of the Invention

The present invention relates to a method and a system apparatus for enabling authorized access to secure areas or systems.

2. Description of the Related Art

The prior art mechanical keyset systems, used since the Roman times, are vulnerable and may be used by any unauthorized person. This may occur if the owner of the keyset system loses it, or if it is copied. In addition, a professional such as a lock-smith for example, can easily open the mechanical keyset, rendering it insecure and useless.

Prior art access systems used with conventional vehicle, for example, have a critical inherent shortcoming in that the keysets do not recognize an authorized user nor can they generate warning for the unauthorized use of the vehicle. Accordingly, anyone who has a key for example, can drive the vehicle without any interruption, making it possible to car-jact the vehicle or kidnap a driver or owner of the vehicle after taking the key by force. More importantly, once a kidnapping occurs, and the victim is forced into a vehicle's enclosed compartment, such as for example, the trunk of a vehicle, the conventional access system cannot and does not recognized this unauthorized access nor can it initiate possible counter measures. Further more, anyone with some expertise can drive any conventional vehicle because they can control the conventional key very easily with an unauthorized key, special instruments, or by forced connection of ignition circuit.

Recently developed prior art immobilizing systems may solve some of the above problems, but the systems are only applicable to new pre-market vehicles from car manufacturers. Existing after market vehicles can not use these systems. Other electronic warning devices for vehicles utilizing IF or RF signals are very easily paralyzed by disconnection of the power supply circuit, and are useless when the remote controller or RF card is stolen or copied, or when the ignition circuit is jump started by force connection.

Conventional keyset systems for doors, safes, office filing cabinets, or military armaments are vulnerable to an unauthorized copy or usage. With conventional access systems a safe or a filing cabinet may be accessed without authorization, exposing the contents therein to an unauthorized person, without the keyset system recognizing its unauthorized usage, compromising security.

Therefore, conventional keyset systems such as a dial combination system, a keypad system or a mechanical key system are not safe. Most prior art accessing systems require an expensive PC network to control various keyset access functions, and further need a special identification card, which is vulnerable to unauthorized copy or usage. This also places additional burden on the users to carry individual special ID cards for different secure systems or areas that require authorized access, increasing the probability of their loss.

In addition to carrying or using conventional access systems for authorized access to secure areas or systems, most individuals also carry several different personal digital data systems. These may for example be in the form of a bank credit card, a club membership cards, a driver license or an ID card.

The prior art does not address the need for a simple and secure authorized access system that can be used to access various secure systems or areas. Therefore, there remains a long standing and continuing need for an advancement in the art that can simplify authorized access to different secure systems and areas without the burden of having to carry and account for the numerous authorized access system cards, personal digital data systems, or other mechanical access units such as for example keys, that an individual must carry to access secure systems or areas.

SUMMARY OF THE INVENTION

The present invention seeks to provide a method and an apparatus that enables authorized access to a multitude of different secure areas or systems in a variety of ways.

The present invention further seeks to provide a method and an apparatus that enables authorized access to a multitude of different secure areas or systems that does not require any specialty accessing mediums, such as for example special ID cards.

The present invention also seeks to provide a method and an apparatus that enables authorized access to a multitude of different secure areas or systems that can use any personal digital data system to authorized access to various secure areas or systems.

The present invention further seeks to provide a method and an apparatus that enables authorized access to a multitude of different secure areas or systems that does not use an expensive PC network.

These goals are accomplished by providing a system apparatus and a method that replaces conventional access systems with the user's personal digital data for authorized access to a multitude of secure systems or areas.

The present invention further seeks to provide a method and an apparatus that enables authorized access to a multitude of different secure areas or systems by replacing the conventional key with a user's personal digital data. The secure areas or systems controlled in a multiway, may include, but are not limited to, for example, a vehicle, a keyset for a safe, an office filing cabinet, and military armaments.

A significant advantage of the present invention is that users can control access to secure areas or systems, such as for example vehicles, with their own digital data systems that can be used for anti-carjacking, a keyless ignition system, a valet parking unit (with valid time limited password) and an overall improved anti-theft of the vehicle.

Another advantage of the invention is that it enables digital keyset systems used with hotel doors to authorize access to users by the use of a guests' entered passwords or the guests' own personal digital data card.

Another aspect of the percent invention is that users can input data into the keyset system with personal digital data sources such as for example, bank credit cards, a club membership card or a drive license, or with digital data generated by a keypad, without the need for any special cards or tools to be carried by an individual just for communication with CPU of the keyset system.

Another aspect of the present invention is that all usage of the keyset is automatically stored and logged in the system memory chip of the key set system.

Yet another aspect of the present invention is that all control functions are done by the system's own CPU in order to control any unauthorized access, without any expensive PC network.

In keeping with the principles of the present invention, a unique access authorization systems is provided that enables an authorized user to access secure systems or areas without the use of any special identification cards or mechanical systems. Users may control access to secure areas or systems by a personal digital data source, a password, or both.

These and other objects, features, aspects, and advantages of the invention will be apparent to those skilled in the art from the following detailed description of preferred non-limiting embodiments, taken together with the drawings and the claims that follow.

BRIEF DESCRIPTION OF THE DRAWINGS

It is to be understood that the drawings are to be used for the purposes of illustration only and not as a definition of the limits of the invention.

Referring to the drawings in which like reference number present corresponding parts throughout.

DETAILED DESCRIPTION OF THE INVENTION

Overcoming the limitations faced from the previous technology, and based on the full comprehension and expectation of the current situations and to clarify the possible barriers faced in the future, the present invention provides technologies, method and system apparatus enabling to replace the conventional key with the user's own personal digital data that users carry by a form of a bank's credit card or a club membership card. A second ID data generator is also provided for increased security, convenience and 3-way control for controlling CPU of the keyset system such as a vehicle, a safe, an office filing cabinet, or military armaments, according to the digital data that users input, eliminating the inconveniences of carrying extra special card or key.

In the following description of the exemplary embodiment, reference is made to the accompanying drawings shown by way of illustration of the specific embodiment by which the invention may be practiced. It is to be understood that other embodiments may be utilized as structural changes may be made without departing from the scope of the present invention.

Figure 1:
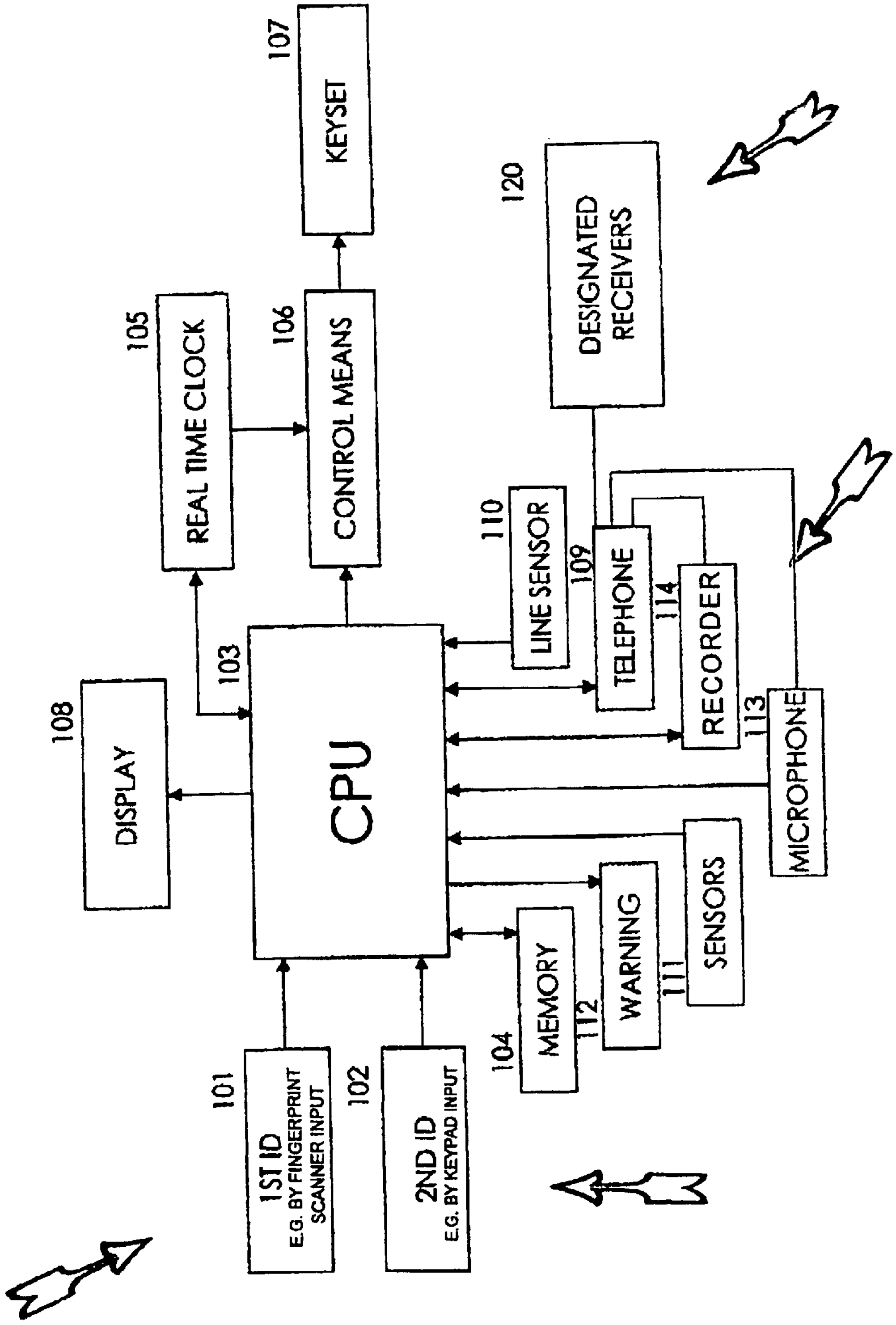
FIG. 1 is a block diagram of multiway control system for keyset according to the present invention.

FIG. 1 illustrates the block diagram of a multiway control system for replacing the conventional keyset with user's identification data according to the present invention. According to the illustration of FIG. 1, the invention comprises the first digital data input means (101) for controlling CPU of the system; the second digital data input means (102) for controlling CPU of the system in addition to the first digital data input means; a memory means (104) coupled to the CPU for memorizing the digital data that the first digital data input means and the second digital data input means inputted; a control means (106) coupled to CPU for controlling the operation of keyset according to the control data signal from CPU of the system; a real time clock (105) for designating the time of each operation for memory means according to the control signal from CPU of the system; a plurality of sensor means (111) for detecting unauthorized access to the keyset; a warning means (112) for warning according to the control signal from CPU of the system coupled to the sensor means; a CPU (103) of the system for controlling the above means and control means (106) to control the function of keyset system according to the preprogrammed instruction signal from the digital data input means (101, 102).

The first digital data input means (101) may comprise of at least one or more personal digital data input element including, but not limited to, for example, a magnetic card reader, an IC card reader, a RF card reader, or a living bionics instrument of user such as a biometrics instrument.

The second digital data input means (102) may comprise of at least one or more digital data inputs including, but not limited to, for example, a keypad system for input of any character including, but not limited to, for example, numbers, letters or symbols.

The data entry device (101,102) may comprise of any input element including, but not limited to, for example, a card reader, a finger print scanner, a video image scanner, a voice scanner, a keypad system of numbers or letters, or any and all combinations thereof.

Furthermore, this system may additionally include a real time clock (105) for designating and storing the time of each operation, a telephone system (109) for communication and remote control of the system from outside or a distance, a recording device (114) for recording a message to deliver to police and other designations, a line sensor (110) for detecting the disconnection of telephone line, a microphone device (113) for delivery of voice signal at the system to various designations through the telephone system, and a display means (108) for displaying the status of the system.

Alternatively, the telephone system (109) may be any communication device including, but not limited to, for example, a wireless telephone system, IF communication system or RF communication system for the wireless communication or any and all combinations thereof.

Now an explanation of the operation of the present invention will be described. User may select from a plurality of a user's identification data according to the system configuration for the digital data input means (101, 102). They may input personal digital data through the first digital data input means (101) and or the second digital data input means (102) to register the user's identification to be used as a key to enable the system operation.

For example, the system may be equipped with a magnetic card reader as the first digital input mans (101) and a keypad as the second digital input means(102). With this combination, the users register their identification data through the first digital data input means (101) with their own personal card such as a bank's credit card or a club membership card that users always carry and want to use as a key, and their passwords through the second digital data input means (102). The CPU (103) receives the ID data signal from the first digital data input means (101) and the second digital input means (102) and stores the digital data signals to the memory means (104). After the registering of user's digital identification data, when at a later time users input this data through the digital data input means (101,

102), the CPU (103) receives the data and compares it to what was read, if the data matches, the CPU (103) orders the control means (106) to activate a keyset (107) as programmed. However, if the read data are not same as the data stored in the memory means (104), the CPU shows an error in the display means (108) and remains silent.

According to the pre-programmed protocol of the CPU (103), there are several different ways to control the system, depending on the personal digital data read. For example, if users stored their card only with the first digital data input means (101), users can control the system with card only. In addition, if users stored their password only with the second digital data input means (102), users can control the system with password only. Furthermore, users may store their digital data both through the first and the second digital data input means (101,102) together. This will enable the users to control the system with two kinds of data together, both a personal digital data system, such as for example, a credit card and a password. Depending on the type of the digital data input (101, 102) being used, users can control the system in three-(3) ways according to the user's choice. This provides enhanced security since intruders would not know how the authorized users stored their data.

Another aspect of the present invention is that the system may be controlled or activated in a variety of different operating modes. For example, two sets of identification data may be entered into the memory (104) through the digital data input means (101, 102), each used to activate the unit in different modes. For instance, the first set of identification data may be used to activate the system in a normal operating mode, whereas the second set may be used to activate the system in an emergency mode.

To illustrate, a user may store data from one credit card with the first ID data input means (101) and or a password with the second ID data input means (102), both as a first set of data for activation of the system in normal operating mode. The user may further store a second set of data, for example, from another credit card and or a password number for an emergency situation in case of forced hand over of his or her card or password to an intruder.

If user inputs any card or password used for an emergency situation, the CPU will recognize the situation by the input data and will control the system as a programmed emergency protocol. Manufacturers of the system can make various kinds of programs for a variety of different operating modes for authorized access to secure systems or areas that include, but are not limited to, for example, limited or temporary mode of operation or access, emergency, kidnapping, and so on.

A safe is one specific example where the present invention may be used. In case of a theft, when the owner is forced to open the safe by intruders, and the emergency data are entered by card and or password, the CPU (103) checks the data by comparing it with the data in the memory means (104) and controls the system for an appropriate counter measure. These may include, but are not limited to, for example, making a call to police and other pre-arranged numbers with the telephone system (109), and the activation of the recorder (114) of the safe to send the recorded message for immediate rescue. The CPU (103) further controls the microphone (113) to send all voice signals, which happen at site of the safe, to the recording device of the police for supporting the continuous rescue operation through a telephone system (109). When the telephone line to the safe is disconnected or tampered, the line sensor (110) coupled to the CPU (103) immediately detects the situation and the CPU activates a high-powered siren instantly so that any attempt to remove the safe after disconnecting the telephone line is not possible. The same principle of operation may be applied to instances of house intrusions.

Hotel door lock systems are another specific example where the present invention may be used. Most Hotel front desk offices issue a check-in card for a guest after appropriate information with respect to hotel room door lock address and check-out time and date is digitally stored. Upon receipt of the check-in card, a guest may then input the data of the check-in card in the first ID data input means (101) and enter any password in the second ID input means (102) within the pre-programmed time of the CPU (103). The CPU (103) is then enabled to recognizes the password entered by the guest, and stores the data in the memory means (104) to permit the password to be use as a key until the check-out time that was input by the check-in card. Hotel guests may use their own card as the above method by inserting another card in the first digital data input means (101) within the pre-programmed time after taking out the check-in card. As the preferred method, hotel guests may use their own card key or password to open the door. This would allow the use of hotel room doors by the password system rather than the card key system, reducing the burden of carrying extra check-in cards, or even personal digital data cards or keys.

Figure 2:
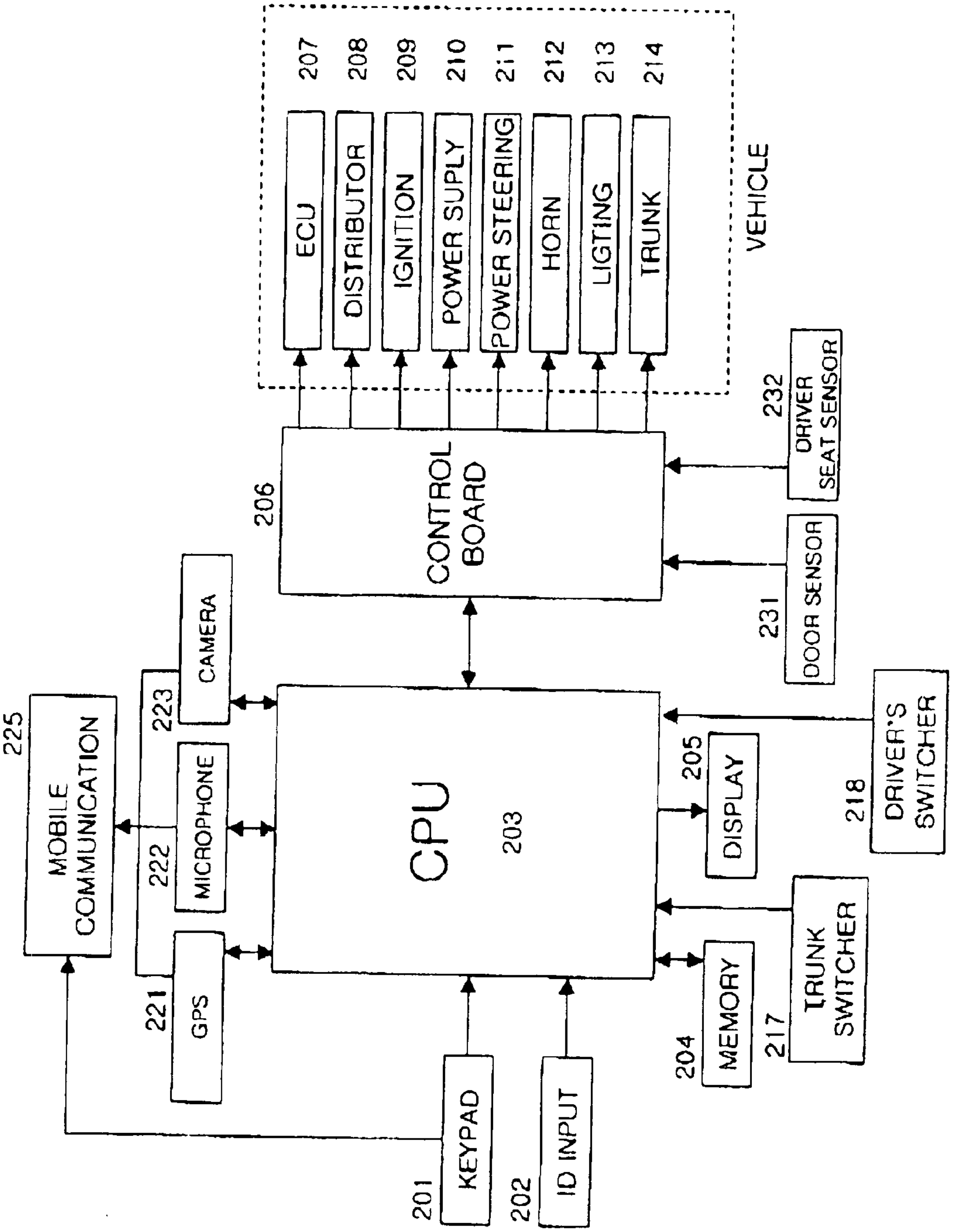
FIG. 2 is a block diagram of multiway control system for keyset of vehicle according to the present invention.

Referring to FIG. 2, the present invention provides a multiway control function for a vehicle with user's identification input. The system comprises the ID data input means (202) for controlling the CPU of the system; the keypad means (201) for controlling CPU of the system in addition to the ID data input means; a memory means (204) for storing the digital data that the user inputted; a control board (206) for controlling the electric functions of the vehicle such as an ECU circuit (207), a distributor circuit (208), an ignition circuit (209), a power supply circuit (210), a power steering circuit (211), a horn circuit (212), a lighting circuit (213) and an unlocking circuit for the trunk comportment of the vehicle according to the instruction signal from the CPU of the system, and a CPU (203) for controlling the system.

This system may additionally include a mobile communication system (225) for communicating between CPU (203) and outside designations with a GPS system (221), a microphone system (222) and camera system (223) for the visual communication; a door sensor (231) for detecting the opening of door; a driver seat sensor (232) for detecting the absence of the driver; and a trunk switcher (217) and diver's switcher (218) for activating the CPU (203) for driving at emergency situation mode as pre-programmed.

Authorized users may register a personal digital identification data for normal driving, a second personal digital identification data for an emergency situation, and another digital identification data for valet parking through the data input means (201, 202) as described in the above method with respect to FIG. 1.

Users can drive their vehicle with the normal driving card and or password in three-(3) ways as described above with respect to FIG. 1. For example, when users are forced to hand over the driving card and or password that was used as "key" to the vehicle to an intruder, the users give a card and or password used for emergency situation.

According to the pre-programmed protocol of the CPU (203), there are many different control methods that may be programmed by manufacturers in accordance with pre-programmed protocol of the CPU (203). If emergency data are entered through the data input means (201, 202), the CPU will control the ignition system (209) of vehicle through the control board (206) to drive the vehicle in a normal manner for 20 seconds only, and after 20 seconds, the CPU commences control of all lighting system (213) (e.g. blinking), the horn (212) is accidentally operated, and the door of the trunk compartment (214) is automatically opened. The CPU then further controls the vehicle's engine to stop it by controlling the control board (206), which makes driving impossible. In the preferred operation, the vehicle moves for only 20 seconds driving distance from the accidental place where the intruder took the key by force. This is for the safety of the owner. Even if the owner is kidnapped and placed in the trunk compartment, the door of the trunk is automatically opened after a 20 seconds drive for rescue.

This invention is also useful when the intruder forcedly opens the door of the vehicle during a temporally stop situation. In that case if the door is opened, the door sensor (231) and the driver seat sensor (232) immediately detect the situation and send an emergency signal to the CPU (203) to turn off the engine through the control board (206) by disconnecting the power supply (210) of the vehicle. If the intruder further demands to drive the vehicle, the authorized users can give the intruder a card and or a password used for emergency situation for the emergency operation as described above.

Further more, if the authorized users are kidnapped and placed in the trunk compartment of the vehicle, they can be easily rescued because the trunk is automatically opened after a pre-programmed time, and also, a kidnapped person can control a trunk switcher (217) for delivering a signal to CPU to drive the vehicle in emergency driving mode for rescue. In situations where the authorized users are forced by an intruder to drive, they can control the driver's switcher (208) for delivering a signal to CPU. The CPU (203) recognizes the situation and drivers the vehicle in a pre-programmed mode, such as an emergency to pull up a bulletproof glass compartment between the guest seat and the driver's seat of the taxi, for example, and automatic lock of the door lock for the arrest of the intruder.

In addition to the above method, if the vehicle is additionally equipped with the mobile communication system (225) with GPS (221), microphone (222) and camera (223) for the communication, when emergency situation is detected, CPU (203) can control the communication system to send a rescue message to pre-programmed designations and deliver the location data of the vehicle by GPS, and all audio and video signal messages from the vehicle for tracing.

Another unique features of the present invention is the use of a card or password for valet parking. When users want to valet park, users insert their normal driving card or input their normal driving password in the data input means (201,202). Once done, the users then insert and or input their valet parking card or password within the time period programmed. The CPU (203) compares the signal inputted with the signal stored in the memory means (204), and if matched, CPU (203) permits the user to input a valid time for valet parking service by a signal of a display means (205) so that the user can input a certain valid time for valet parking service with a keypad (202). The CPU will indicate by a signal that the valet parking service's valid time was stored. Therefore, user can hand over the card or the password that the user stored the operational valid time, to a valet attendant so that the valet attendant can drive the vehicle with a card or a password during the permitted time period only. The use of the card or the password is invalid after the valet service's valid time is passed by CPU.

As described, the significant advantage of the present invention is that it provides a system apparatus and a method for replacing the conventional key with a user's personal digital data that users always carry, eliminating the burden to carry or lose keys and the worries for memorizing or forgetting a complicated dial combinations of the conventional system, as well as to provide the enhanced security standard by controlling the system with a digital data of user's choice in multiways.

Another aspect of the present invention is that users can control the vehicle in multiways with user's identification entry for an anti-carjacking, a keyless ignition, a keyless valet parking and an improved anti-thief of the vehicle by identification.

Yet another aspect of the present invention is to provide a new hotel door lock system that enables guests to use their own personal digital data systems or password for unlocking hotel room doors to be free from the hotel key system and need not to carry anything extra for the entrance to a hotel room, providing the maximum convenience to the hotel guests.

While the above description contains many specifics, these should not be construed as limitations on the scope of the invention, but rather as an exemplification of preferred embodiments thereof. Numerous variations and alternative embodiments are possible and will occur to those skilled in the art, without departing from the essential spirit of this invention. Accordingly, the scope of the invention should be determined not by the embodiments illustrated, but by the appended claims and their legal equivalents.

What is claimed is:

1. A system apparatus for replacing a key with a digital ID data of users for controlling a keyset in multiway by a first ID data, a second ID data, or a first ID data with a second ID data together, according to the ID data of a user's input, for a keyset of a vehicle, a lockable door, a filing cabinet, a safe and an armaments, comprising, a first ID data input means for entering a user's first ID data with a user's personal card or any of the biometrics data of a user to control the keyset system;

a second ID data input means for entering a user's second ID data by a keypad or a card reader to control the keyset system in individual or in addition to the first ID data input means;

a memory means for storing the digital data from the first ID data input means and the second ID data input means;

a sensor means for detecting unauthorized access to the keyset;

a central processing unit (CPU) for controlling the system according to the data from the first ID data input means or the second ID data input means and the sensor means;

a control means coupled to the central processing unit (CPU) for controlling the operation of a keyset system according to the instruction signal from the central processing unit; and, a keyset system coupled to the control means for locking and unlocking of the system by an instruction signal from the control means.

2. The system apparatus of claim 1, further comprising a real time clock means coupled to the CPU for designating the real time of operation of the system by storing the real time data in the memory means.

3. The system apparatus of claim 1, further comprising a display means coupled to the CPU for displaying the status of the system operation.

4. The system apparatus of claim 1, further comprising a wire or wireless telephone system for receiving and transmitting a message signal through a telephone system, and for controlling the system from outside utilizing a DTMF tone.

5. The system apparatus of claim 4, further comprising an audio recording and playing means for recording a message to be delivered to a designated address when the security violation is detected, a sensor for detecting telephone line cut, sensors for detecting shock and a heat attack, and a warning means coupled to the CPU for warning in accordance with the signal from the said sensors.

6. The system apparatus of claim 5, further comprising a microphone coupled to the telephone system for receiving sounds around the system to deliver the sound to designated receivers.

7. The system apparatus of claim 5, further comprising an audio recording means and/or an image recrding means coupled to the CPU for recording the image and/or sound of the intruders when the security violation is detected.

8. The system apparatus of claim 1, further comprising a RF communication system for communicating between the system and a user.

9. The system apparatus of claim 1, further comprising an IR receiving means coupled to the CPU for communicating the system control data by IR means.

10. A system apparatus of claim 1, further comprising a warning system for delivering a warning signal or message to designated receivers when an emergency ID data is entered through the first ID data input means or the second ID data input means.

11. A system apparatus of claim 10, wherein the warning system is comprising a wire or a wireless communication system for delivering a message for rescue.

12. A system apparatus of claim 11, wherein the warning system is further comprising a microphone or a videophone system for delivering the audio or the video information to the designated address for tracing the security violated situation.

13. A system apparatus for controlling a vehicle in any of 3-ways comprising the first ID data input means, the second ID data input means, or the first ID data input means and the second ID data input means together, comprising, a first ID data input means for entering a user's first ID data with a card reader or a biometrics scanner for controlling a vehicle;

a second ID data input means for entering a user's second ID data with a keypad for controlling a vehicle in addition to the first ID input means;

a memory means for storing the digital data from the first ID data input means and the second ID data input means;

a control means coupled to a CPU for controlling the functions of a vehicle according to the instruction signal from the CPU; and, a central processing means (CPU) for controlling the system according to the data from the first ID data input means or the second ID data input means.

14. The system apparatus of claim 13, wherein the control means is further controlling the vehicle in a normal driving mode or an abnormal driving mode by controlling the on/off of power supply to the engine, by warning with a horn and blinking of a light, and by opening a trunk compartment of a vehicle comprising, at least two or more of the relaying means for controlling on/off of electric supply lines of a vehicle's engine ignition system;

a control means for controlling blinking of a lighting system of a vehicle;

a control means for controlling a vehicle's horn system;

a control means for controlling an unlocking circuit of a trunk compartment of a vehicle.

15. The system apparatus of claim 13, wherein the control means is further comprising an airbag control means for activating an airbag according to the instruction signal from the CPU.

16. The system apparatus of claim 13, wherein the control means is further comprising a power on/off means of a power steering system of a vehicle according to the instruction signal from the CPU.

17. The system apparatus of claim 13, wherein the control means is further comprising a sensor means for detecting the opening of a door to control the on/off of a vehicle's engine by the CPU.

18. The system apparatus of claim 13, wherein the control means is further comprising a sensor means for detecting the absence of the driver to control the on/off of a vehicle's engine by the CPU.

19. The system apparatus of claim 13, wherein the control means is further comprising a switch means in a trunk compartment of a the vehicle for sending a signal to the CPU to drive a vehicle in abnormal drive mode.

20. The system apparatus of claim 13, wherein the control means is further comprising a communication means between the CPU and an ECU of a vehicle to control a vehicle in normal mode or abnormal mode in accordance with the instruction signal to the ECU from the CPU.

21. The system apparatus of claim 13, wherein the control means is further comprising a mobile communication means and a GPS apparatus for the transmission of data of the location of a vehicle to designated receivers.

22. The system apparatus of claim 13, wherein the control means is further comprising a microphone means, a camera means and a mobile communication means for transmitting visual and sound information in a vehicle to designated receivers.

23. The system apparatus of claim 13, wherein the control means is further comprising a power on/off means to the ECU for controlling power supply to the ECU according to an instruction signal from the CPU.

24. A method for controlling a vehicle in multiways for the normal driving or the abnormal driving with driver's ID data comprising the step of, configuring a system for controlling a vehicle comprising a first ID data input means by a card reader or a biometrics scanner and a second ID data input means by a keypad for controlling a vehicle, a memory means for storing ID data, a central processing unit (CPU) for controlling the above means and the system, and a control means, coupled to CPU for controlling the system in accordance with the instruction signal from CPU;

entering the driver's ID data through the first ID data input means or the second ID data input means for entering the driver's ID data of a normal drive and an abnormal drive for CPU of the system;

memorizing the normal driving ID data and the abnormal driving ID data through the first ID data input means or the second ID data input means in the memory means coupled to the CPU; and, controlling the vehicle in the normal driving mode or in the abnormal driving mode by controlling at least two or more of the electric power supply of the engine ignition system, a blinking control of the light system, a horn system, and an unlocking system of the trunk compartment of the vehicle, with CPU in accordance with the driver's ID data entering after comparing the data stored in the memory means.

25. The method of claim 24, wherein installing the first ID data input means with a card reader and the second ID data input means with a keypad.

26. The method of claim 25, further comprising the step of, entering a normal drive card or password, and an abnormal drive card or password, through the card reader or the keypad for memorizing in the memory means of CPU;

entering a normal drive card or password for normal drive situation;

entering an abnormal drive card or password for driving the vehicle during designated time in normal and warning after that normal drive time by blinking of the light system, giving an alarm with the horn system, and opening the trunk compartment of the vehicle;

stopping the vehicle by cutting the electric power to the ignition system after a designated abnormal driving time.

27. The method of claim 25, further comprising the step for making a card or a password of a normal driving or an abnormal driving comprising the step of, entering the master card or the master password through the first ID data input means or the second ID data input means;

entering again a normal driving card or a normal driving password through the first ID data input means or the second ID data input means within the valid time which programmed on CPU to accept as a card or a password for a normal driving or an abnormal driving; and, entering again an abnormal driving card or password as the same way as the step (1) and step (2).

28. The method of claim 27, wherein the ID data input means comprising a card reader means and ID data are to be contained in a card.

29. The method of claim 24, wherein the first ID data input means is comprising a finger print scanner and the second ID data input means is comprising a keypad.

30. A method for driving a vehicle with ID data or a password which is valid for the designated time period for valet parking service, comprising the step of, configuring a system for controlling vehicle comprising a ID data input means for control the system, a keypad means for storing a password or for designating a time for valet parking service, a memory means for storing the driver's ID data and a valid time of the designated ID data, and a CPU for controlling the vehicle's ignition system in accordance with the ID data entered;

memorizing the normal driving ID data or a password of the driver in a memory means coupled to the CPU through the ID data input means or a keypad means;

entering the said driver's ID data or a password for normal driving through the ID data input means or a keypad means to the CPU of the system and again entering a new ID data or a password for valet parking service through the ID data input means or a keypad means and a time designation for valet parking service through a keypad means within the programmed time permitted or the programmed procedure;

driving a vehicle for valet parking service during the designated time period by entering the new ID data or a password for valet parking service and terminating the validity of the new ID data or a password after the designated time period passed by CPU.

31. A system apparatus of hotel door lock utilizing a card reader and a keypad for issuing user's card or user's password by user for replacing the existing card key of the hotel, comprising, a card reader means for entering user's ID data with a user's personal card;

a keypad means for entering user's second ID data with user's password;

a memory means for storing user's ID data through a card reader means or a keypad means;

a real time clock means coupled to the CPU for designating the real time of the system operation;

an address means for designating address of the door lock system coupled to the CPU; and, a central processing unit(CPU) for controlling the above said means and the system operation.

32. A method for issuing a password or a card by user for replacing the hotel's card key to open the hotel door lock with a password or a user's personal card comprising the step of, configuring a door lock system comprising a card reader for entering user's ID data by user's personal card, a keypad means for entering user's ID data by user's password, a memory means for storing user's ID data, a real time clock for designating the real time, an address means for designating address of the door lock system, and a central processing unit(CPU) for controlling the system;

issuing a card key from hotel front desk with a address data of the door lock of hotel guest room and a data of the checkout time;

entering the card key to the card reader means of hotel door lock for delivering the data of checkout time and date;

entering again user's personal card or a password within the time period which programmed to be activated for memorizing the data of the user's personal card or user's password to be used as the opening data of the door lock system within the same valid time period of the hotel card key; and, using the above user's personal card or a password to open the door lock during the same time period as the original card key issued at hotel front desk.

* * * * *